US010266653B2

(12) United States Patent
Kalyanaraman

(10) Patent No.: US 10,266,653 B2
(45) Date of Patent: Apr. 23, 2019

(54) POLYIMIDE-FORMING COMPOSITIONS, METHODS OF MANUFACTURE, AND ARTICLES PREPARED THEREFROM

(71) Applicant: SABIC Global Technologies B.V., Bergen op Zoom (NL)

(72) Inventor: Viswanathan Kalyanaraman, Newburgh, IN (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 4 days.

(21) Appl. No.: 15/538,860

(22) PCT Filed: Dec. 22, 2015

(86) PCT No.: PCT/US2015/067458
§ 371 (c)(1),
(2) Date: Jun. 22, 2017

(87) PCT Pub. No.: WO2016/109354
PCT Pub. Date: Jul. 7, 2016

(65) Prior Publication Data
US 2017/0362385 A1  Dec. 21, 2017

Related U.S. Application Data

(60) Provisional application No. 62/098,563, filed on Dec. 31, 2014.

(51) Int. Cl.
C08G 73/10 (2006.01)
C09D 179/08 (2006.01)

(52) U.S. Cl.
CPC ....... C08G 73/1032 (2013.01); C09D 179/08 (2013.01)

(58) Field of Classification Search
CPC .................................. C08G 73/1032
See application file for complete search history.

(56) References Cited

U.S. PATENT DOCUMENTS

| 3,528,937 A | 9/1970 | Reynolds et al. |
| 3,893,811 A | 7/1975 | Good et al. |
| 4,011,279 A * | 3/1977 | Berger ................. C08G 77/455 524/588 |
| 5,719,253 A | 2/1998 | Echigo et al. |
| 2014/0093715 A1 | 4/2014 | Fujii et al. |
| 2014/0213723 A1 | 7/2014 | Miyamoto et al. |

FOREIGN PATENT DOCUMENTS

| EP | 1086973 A2 | 3/2001 |
| WO | 2013105619 | 7/2013 |
| WO | WO 2013/105619 A1 * | 7/2013 |

OTHER PUBLICATIONS

International Search Report for International Application No. PCT/US2015/067458; International Filing Date: Dec. 22, 2015; dated Mar. 10, 2016; 6 pages.
Written Opinion of the International Searching Authority for International Application No. PCT/US2015/067458 filed on Dec. 22, 2015; dated Mar. 10, 2016; 7 pages.

* cited by examiner

Primary Examiner — Robert D. Harlan
(74) Attorney, Agent, or Firm — Cantor Colburn LLP

(57) ABSTRACT

A polyimide-forming composition includes a polyimide prepolymer, an amine, and a solvent comprising a $C_{1-6}$ alcohol. A method of manufacturing the polyimide-forming composition is disclosed. The method includes heating a substituted or unsubstituted $C_{4-40}$ bisanhydride in a $C_{1-6}$ alcohol to dissolve the bisanhydride, adding a substituted or unsubstituted divalent $C_{1-20}$ diamine to form a polyimide prepolymer, and adding the amine in an amount effective to solubilize the polyimide prepolymer in the $C_{1-6}$ alcohol, in a solution of the $C_{1-6}$ alcohol and deionized water, or in deionized water. A method of manufacturing an article including a polyimide is also disclosed.

19 Claims, No Drawings

POLYIMIDE-FORMING COMPOSITIONS, METHODS OF MANUFACTURE, AND ARTICLES PREPARED THEREFROM

CROSS-REFERENCE TO RELATED APPLICATIONS

This application is a National Stage application of PCT/US2015/067458, filed Dec. 22, 2015, which claims the benefit of U.S. Provisional Application No. 62/098,563, filed Dec. 31, 2014, both of which are incorporated by reference herein in their entirety.

BACKGROUND

Polyimides, in particular polyetherimides (PEI), are amorphous, transparent, high performance polymers having a glass transition temperature (Tg) of greater than 180° C. Polyetherimides further have high strength, toughness, heat resistance, and modulus, and broad chemical resistance, and so are widely used in industries as diverse as automotive, telecommunication, aerospace, electrical/electronics, transportation, and healthcare. Polyetherimides have shown versatility in various manufacturing processes, proving amenable to techniques including injection molding, extrusion, and thermoforming, to prepare various articles.

However, they are typically high viscosity materials and the high viscosity, combined with the high Tg, can hinder the use of polyetherimides in certain manufacturing operations, such as the manufacture of composites and coatings. For example, because of the high Tg of polyimides, formation of intricate parts or highly conformal coatings requires high temperatures that may not be compatible with other components. Composites, coatings, and thin films are currently manufactured using polymer solutions containing organic solvents, which adds removal and recycling costs. Residual solvent can be a further issue in certain applications, particularly the electronics industry.

Accordingly, there remains a continuing need for new methods of manufacturing polyimides and articles comprising the polyimides, particularly methods that do not rely on organic solvents.

BRIEF DESCRIPTION

A polyimide-forming composition comprises a polyimide prepolymer, an amine, and a solvent comprising a $C_{1-6}$ alcohol.

A method of manufacturing the polyimide-forming composition comprises heating a substituted or unsubstituted $C_{4-40}$ bisanhydride in a $C_{1-6}$ alcohol to dissolve the bisanhydride; adding a substituted or unsubstituted divalent $C_{1-20}$ diamine to form a polyimide prepolymer; and adding the amine in an amount effective to solubilize the polyimide prepolymer in the $C_{1-6}$ alcohol, in a solution of the $C_{1-6}$ alcohol and deionized water, or in deionized water.

A method of manufacturing an article comprising a polyimide comprises forming a preform comprising the polyimide-forming composition; and heating the preform at a temperature and for a period of time effective to imidize the polyimide prepolymer and form the polyimide.

An article prepared by the above-described method is also disclosed.

The above described and other features are exemplified by the following detailed description.

DETAILED DESCRIPTION

Described herein is a method for manufacturing a polyimide, for example, a thin layer or conformal coating that does not use an organic solvent to solubilize the polyimide. In particular, the polyimide is manufactured from a polyimide-forming composition comprising a polyimide prepolymer, an amine, and a solvent comprising a $C_{1-6}$ alcohol. It has been unexpectedly found by the inventors hereof that the amine can be added to the polyimide prepolymer solution to effectively solubilize the polyimide prepolymer in the $C_{1-6}$ alcohol, in a solution of the $C_{1-6}$ alcohol and deionized water, or in deionized water. The polyimide-forming composition can be used to form a layer or a coating, and the prepolymer can be imidized in situ. The method is environmentally friendly, and allows for very thin layers to be obtained. In another advantageous feature, the polyimide can be formed in the absence of a chain terminating agent, allowing high molecular weight polyimides to be obtained. Other components such as crosslinkers, particulate fillers, and the like can be present. The method is useful not only for layers and coatings, but also for forming composites.

The polyimide-forming composition comprises a polyimide prepolymer, an amine, and a solvent comprising a $C_{1-6}$ alcohol.

The polyimide prepolymer comprises a substituted or unsubstituted $C_{4-40}$ bisanhydride and a substituted or unsubstituted divalent $C_{1-20}$ diamine as described in further detail below. The relative ratios of the bisanhydride and the diamine can be varied depending on the desired properties of the polyimides. Use of an excess of either monomer can result in a polymer having functionalized end groups. In an embodiment, a mole ratio of the bisanhydride to the diamine can be 1:1 to 1:1.3, preferably 1:1 to 1:1.2 or 1:1 to 1:1.1. In another embodiment, a mole ratio of the diamine to the bisanhydride is 1:1 to 1:1.3, preferably 1:1 to 1:1.2 or 1:1 to 1:1.1.

The polyimides are prepared from bisanhydrides of formula (1)

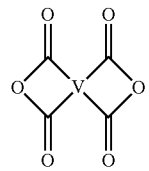

(1)

wherein V is a substituted or unsubstituted tetravalent $C_{4-40}$ hydrocarbon group, for example a substituted or unsubstituted $C_{6-20}$ aromatic hydrocarbon group, a substituted or unsubstituted, straight or branched chain, saturated or unsaturated $C_{2-20}$ aliphatic group, or a substituted or unsubstituted $C_{4-8}$ cycloalkylene group or a halogenated derivative thereof, in particular a substituted or unsubstituted $C_{6-20}$ aromatic hydrocarbon group. Exemplary aromatic hydrocarbon groups include any of those of the formulas

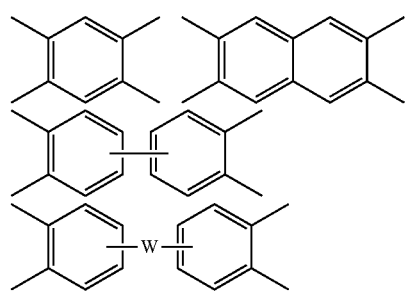

wherein W is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or a group of the formula T as described in formula (2) below.

The polyimides include polyetherimides. Polyetherimides can be prepared by the reaction of an aromatic bis(ether anhydride) of formula (2)

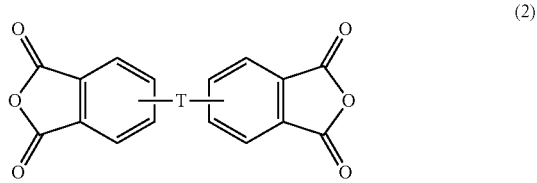

(2)

wherein T is —O— or a group of the formula —O—Z—O— wherein the divalent bonds of the —O— or the —O—Z—O— group are in the 3,3', 3,4', 4,3', or the 4,4' positions. The group Z in —O—Z—O— of formula (2) is also a substituted or unsubstituted divalent organic group, and can be an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded. Exemplary groups Z include groups derived from a dihydroxy compound of formula (3)

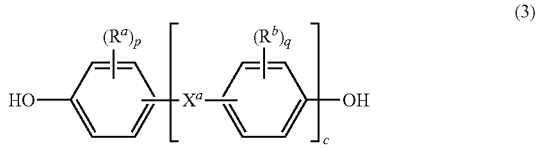

(3)

wherein R$^a$ and R$^b$ can be the same or different and are a halogen atom or a monovalent C$_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —SO$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (3a)

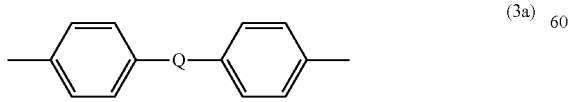

(3a)

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is derived from bisphenol A, such that Q in formula (3a) is 2,2-isopropylidene.

Illustrative examples of bis(anhydride)s include 3,3-bis[4-(3,4-dicarboxyphenoxy)phenyl]propane bisanhydride; 4,4'-bis(3,4-dicarboxyphenoxy)diphenyl ether bisanhydride; 4,4'-bis(3,4-dicarboxyphenoxy)diphenyl sulfide bisanhydride; 4,4'-bis(3,4-dicarboxyphenoxy)benzophenone bisanhydride; 4,4'-bis(3,4-dicarboxyphenoxy)diphenyl sulfone bisanhydride; 2,2-bis[4-(2,3-dicarboxyphenoxy)phenyl]propane bisanhydride; 4,4'-bis(2,3-dicarboxyphenoxy)diphenyl ether bisanhydride; 4,4'-bis(2,3-dicarboxyphenoxy)diphenyl sulfide bisanhydride; 4,4'-bis(2,3-dicarboxyphenoxy)benzophenone bisanhydride; 4,4'-bis(2,3-dicarboxyphenoxy)diphenyl sulfone bisanhydride; 4-(2,3-dicarboxyphenoxy)-4'-(3,4-dicarboxyphenoxy)diphenyl-2,2-propane bisanhydride; 4-(2,3-dicarboxyphenoxy)-4'-(3,4-dicarboxyphenoxy)diphenyl ether bisanhydride; 4-(2,3-dicarboxyphenoxy)-4'-(3,4-dicarboxyphenoxy)diphenyl sulfide bisanhydride; 4-(2,3-dicarboxyphenoxy)-4'-(3,4-dicarboxyphenoxy) benzophenone bisanhydride; and, 4-(2,3-dicarboxyphenoxy)-4'-(3,4-dicarboxyphenoxy)diphenyl sulfone bisanhydride, pyromellitic dianhydride, as well as various combinations thereof.

The bisanhydrides can be reacted with an organic diamine of formula (4)

$$H_2N—R—NH_2 \qquad (4)$$

wherein R is a substituted or unsubstituted divalent C$_{1-20}$ hydrocarbon group, such as a substituted or unsubstituted C$_{6-20}$ aromatic hydrocarbon group or a halogenated derivative thereof, a substituted or unsubstituted, straight or branched chain, saturated or unsaturated C$_{2-20}$ alkylene group or a halogenated derivative thereof, a substituted or unsubstituted C$_{3-8}$ cycloalkylene group or halogenated derivative thereof, in particular a divalent group of formulas (5)

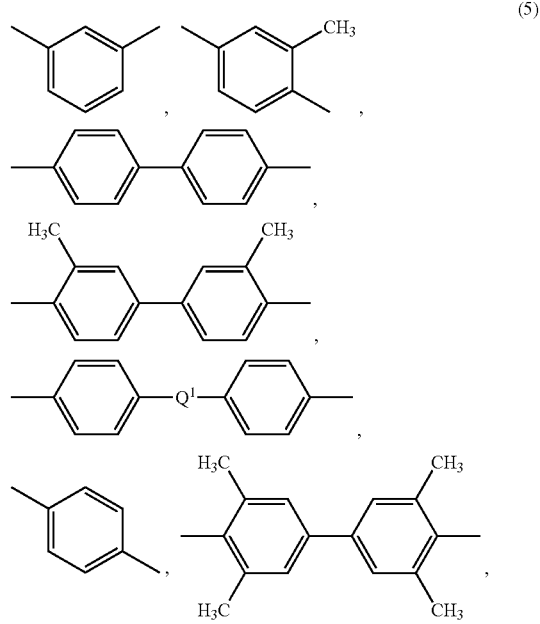

(5)

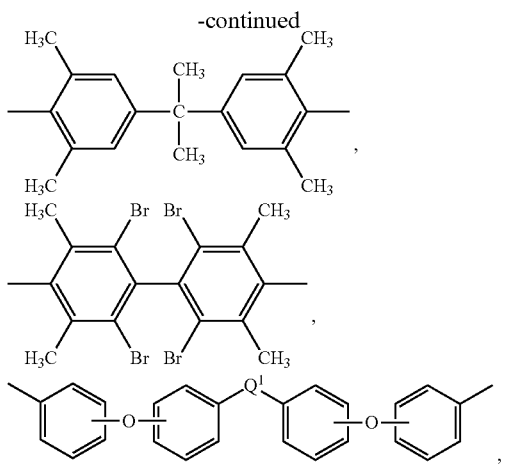

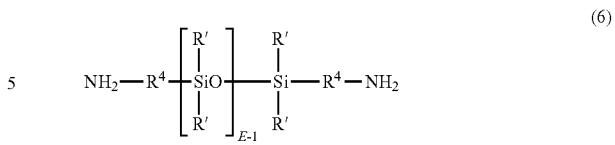

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment R is m-phenylene, p-phenylene, or 4,4'-diphenylene sulfone. In some embodiments, no R groups contain sulfone groups. In another embodiment, at least 10 mol % of the R groups contain sulfone groups, for example 10 to 80 wt % of the R groups contain sulfone groups, in particular 4,4'-diphenylene sulfone groups.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylenediamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, 4,4'-methylenedianiline, and bis(4-aminophenyl) ether. Combinations of these compounds can also be used. In some embodiments the organic diamine is m-phenylenediamine, p-phenylenediamine, 4,4'-sulfonyl dianiline, or a combination comprising one or more of the foregoing.

In some embodiments, the aromatic bisanhydride of formula (1) or (2) can be reacted with a diamine component comprising an organic diamine (4) as described above or a mixture of diamines, and a polysiloxane diamine of formula (6)

wherein each R' is independently a $C_{1-13}$ monovalent hydrocarbyl group. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R' groups can be used in the same copolymer. In an embodiment, the polysiloxane diamine comprises R' groups that have minimal hydrocarbon content, e.g., a methyl group.

E in formula (6) has an average value of 5 to 100, and each $R^4$ is independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkyl group, specifically a $C_2$-$C_{20}$ alkyl group such as propylene, and E has an average value of 5 to 100, 5 to 75, 5 to 60, 5 to 15, or 15 to 40. Procedures for making the polysiloxane diamines of formula (6) are well known in the art.

The diamine component can contain 10 to 90 mole percent (mol %), or 20 to 50 mol %, or 25 to 40 mol % of polysiloxane diamine (6) and 10 to 90 mol %, or 50 to 80 mol %, or 60 to 75 mol % of diamine (4). The diamine components can be physically mixed prior to reaction with the bisanhydride(s), thus forming a substantially random copolymer. Alternatively, block or alternating copolymers can be formed by selective reaction of (4) and (6) with aromatic bis(ether anhydride)s (1) or (2), to make polyimide blocks that are subsequently reacted together. Thus, the polyimide-siloxane copolymer can be a block, random, or graft copolymer.

The polyimides formed from the precursor compositions accordingly comprise more than 1, for example 10 to 1000, or 10 to 500, structural units of formula (7)

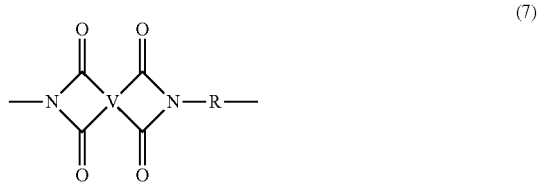

wherein each V is the same or different, and is as described in formula (1), and each R is the same or different, and is defined as in formula (4). The polyetherimides comprise more than 1, for example 10 to 1000, or 10 to 500, structural units of formula (8)

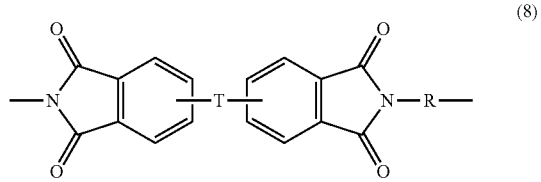

(8)

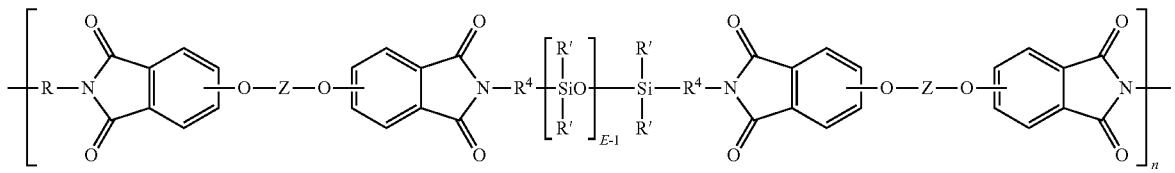

wherein each T is the same or different, and is as described in formula (2), and each R is the same or different, and is as described in formula (4), preferably m-phenylene or p-phenylene.

The polyetherimides can optionally further comprise up to 10 mol %, up to 5 mol %, or up to 2 mol % of units of formula (8) wherein T is a linker of the formula

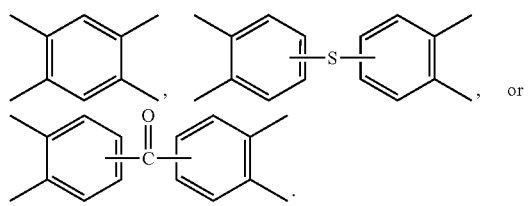

In some embodiments no units are present wherein R is of these formulas.

In an embodiment in formula (1), R is m-phenylene or p-phenylene and T is —O—Z—O— wherein Z is a divalent group of formula (3a). Alternatively, R is m-phenylene or p-phenylene and T is —O—Z—O— wherein Z is a divalent group of formula (3a) and Q is 2,2-isopropylidene.

In an embodiment, the polyetherimide can be a polyetherimide sulfone. For example, the polyetherimide can comprise the etherimide units wherein at least 10 mol %, for example 10 to 90 mol %, 10 to 80 mol %, 20 to 70 mol %, or 20 to 60 mol % of the R groups comprise a sulfone group. For example, R can be 4,4'-diphenylene sulfone, and Z can be 4,4'-diphenylene isopropylidene, providing units of the following formula.

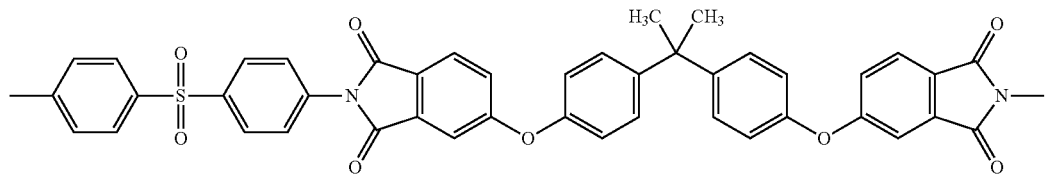

In another embodiment the polyetherimide can be a polyetherimide-siloxane block or graft copolymer. Block polyimide-siloxane copolymers comprise imide units and siloxane blocks in the polymer backbone. Block polyetherimide-siloxane copolymers comprise etherimide units and siloxane blocks in the polymer backbone. The imide or etherimide units and the siloxane blocks can be present in random order, as blocks (i.e., AABB), alternating (i.e., ABAB), or a combination thereof. Graft copolymers are non-linear copolymers comprising the siloxane blocks connected to a linear or branched polymer backbone comprising imide or etherimide blocks.

In an embodiment, a polyetherimide-siloxane has units of the formula

wherein R' and E of the siloxane are as in formula (6), the R and Z of the imide are as in formula (2), $R^4$ is the same as $R^4$ as in formula (6), and n is an integer from 5 to 100. In a specific embodiment, the R of the etherimide is a phenylene, Z is a residue of bisphenol A, $R^4$ is n-propylene, E is 2 to 50, 5, to 30, or 10 to 40, n is 5 to 100, and each R' of the siloxane is methyl. In an embodiment the polyetherimide-siloxane comprises 10 to 50 weight percent (wt %), 10 to 40 wt %, or 20 to 35 wt % polysiloxane units, based on the total weight of the polyetherimide-siloxane.

The polyimide-forming composition further comprises an amine. The amine can comprise a secondary amine, a tertiary amine, or a combination comprising at least one of the foregoing. In some embodiments, the amine preferably comprises a tertiary amine.

The amine can be selected such that less than or equal to 0.5 grams of the amine is effective to solubilize 1 gram of the polyimide prepolymer in deionized water.

In some embodiments, the amine is a secondary or a tertiary amine of the formula $R^a R^b R^c N$ wherein each $R^a$, $R^b$, and $R^c$ are the same or different and are a substituted or unsubstituted $C_{1-18}$ hydrocarbyl or hydrogen, provided that no more than one of $R^a$, $R^b$, and $R^c$ are hydrogen. Preferably each $R^a$, $R^b$, and $R^c$ are the same or different and are a substituted or unsubstituted $C_{1-12}$ alkyl, a substituted or unsubstituted $C_{1-12}$ aryl, or hydrogen, provided that no more than one of $R^a$, $R^b$, and $R^c$ are hydrogen. More preferably each $R^a$, $R^b$, and $R^c$ are the same or different and are an unsubstituted $C_{1-6}$ alkyl or a $C_{1-6}$ alkyl substituted with 1, 2, or 3 hydroxyl, halogen, nitrile, nitro, cyano, $C_{1-6}$ alkoxy, or amino groups of the formula —$NR^d R^e$ wherein each $R^d$ and $R^e$ are the same or different and are a $C_{1-6}$ alkyl or $C_{1-6}$ alkoxy. Most preferably, each $R^a$, $R^b$, and $R^c$ are the same or different and are an unsubstituted $C_{1-4}$ alkyl or a $C_{1-4}$ alkyl substituted with one hydroxyl, halogen, nitrile, nitro, cyano, or $C_{1-3}$ alkoxy.

In some embodiments, the amine comprises triethylamine, trimethylamine, dimethylethanolamine, diethanolamine, or a combination comprising at least one of the foregoing. For example, the amine comprises triethylamine. For example, the amine comprises dimethylethanolamine. For example, the amine comprises diethanolamine.

The amine can be added to the polyimide-forming composition in an amount effective to solubilize the polyimide prepolymer in a $C_{1-6}$ alcohol, in a solution of the $C_{1-6}$ alcohol and deionized water, or in deionized water. For example, the amine can be present in the polyimide-forming composition in an amount of 5 to 50 wt %, or 8 to 40 wt %, or 9 to 35 wt %, based on the combined weight of the amine and the dry weight of the polyimide prepolymer.

The polyimide-forming composition further comprises a solvent, for example a protic organic solvent. Possible protic organic solvents include a $C_{1-6}$ alcohol, wherein the $C_{1-6}$ alkyl group can be linear or branched. The $C_{1-6}$ alcohol can include methanol, ethanol, n-propanol, isopropanol, n-butanol, t-butanol, sec-butanol, 1-pentanol, 2-pentanol, 3-pentanol, 1-hexanol, 2-hexanol, 3-hexanol, 2-ethyl-1-hexanol, 3-methyl-1-butanol, 3-methyl-2-butanol, 2-methyl-2-butanol, 2,2-dimethyl-1-propanol, ethylene glycol, diethylene glycol, or a combination comprising at least one of the foregoing. In some embodiments, the $C_{1-6}$ alcohol is substantially miscible with water. For example the $C_{1-6}$ alcohol can comprise methanol, ethanol, n-propanol, isopropanol, or a combination comprising at least one of the foregoing. In an embodiment, the solvent comprises methanol, ethanol, or a combination comprising at least one of the foregoing.

In some embodiments, the solvent further comprises water, for example deionized water. The solvent can include water in a weight ratio of $C_{1-6}$ alcohol:water of 1:100 to 100:1, preferably 1:10 to 10:1, more preferably 1:2 to 2:1, even more preferably 1:1.1 to 1.1:1. In other embodiments, however, no water is present. For example, the solvent comprises less than 1 weight percent (wt %), or is devoid of water.

In an embodiment, the solvent comprises less than 1 wt %, or is devoid of, a chlorobenzene, dichlorobenzene, cresol, dimethyl acetamide, veratrole, pyridine, nitrobenzene, methyl benzoate, benzonitrile, acetophenone, n-butyl acetate, 2-ethoxyethanol, 2-n-butoxyethanol, dimethyl sulfoxide, anisole, cyclopentanone, gamma-butyrolactone, N,N-dimethyl formamide, N-methyl pyrrolidone, tetrahydrofuran, dichloromethane or a combination comprising at least one of the foregoing. In another embodiment, the solvent comprises less than 1 wt %, or less than 0.1 wt % of a nonprotic organic solvent, and preferably the solvent is devoid of a nonprotic organic solvent. In another embodiment, the solvent comprises less than 1 wt %, or less than 0.1 wt %, of a halogenated solvent, and preferably the solvent is devoid of a halogenated solvent.

The polyimide-forming compositions can comprise, based on the total weight of the compositions, 1 to 90 wt %, preferably 5 to 80 wt %, more preferably 10 to 70 wt % of the polyimide prepolymer; 10 to 99 wt %, preferably 20 to 95 wt %, more preferably 30 to 90 wt % of the solvent; and 0.001 to 50 wt %, preferably 0.01 to 30 wt %, more preferably 0.01 to 15 wt % of the amine.

The polyimide-forming compositions can further comprise additional components to modify the reactivity or processability of the compositions, or properties of the polyimides and articles formed from the polyimides. For example, the polyimide-forming compositions can further comprise a polyimide endcapping agent to adjust the molecular weight of the polyimide. Such endcapping agents are known, and include, for example, monofunctional amines such as aniline and mono-functional anhydrides such as phthalic anhydride, maleic anhydride, or nadic anhydride. The endcapping agents can be present in an amount of 0.01 mole percent to 10 mole percent, more preferably 1 mole percent to 5 mole percent based on total moles of one of the bisanhydride or diamine monomer. In an embodiment, the polyimide prepolymer is partially endcapped. In another embodiment, however, no endcapping agent is present in the polyimide-forming compositions.

In another embodiment, the polyimide-forming compositions can further comprise a polyimide crosslinking agent. Such crosslinking agents are known, and include, compounds containing an amino group or an anhydride group and crosslinkable functionality, for example ethylenic unsaturation. Examples include maleic anhydride and benzophenone tetracarboxylic acid anhydride. The crosslinking agents can be present in an amount of 0.01 mole percent to 10 mole percent, more preferably 1 mole percent to 5 mole percent based on total moles of one of the bisanhydride or diamine monomer.

The polyimide-forming compositions can further comprise a branching agent, for example a polyfunctional organic compound having at least three functional groups which can be, for example, amine, carboxylic acid, carboxylic acid halide, carboxylic anhydride, and mixtures thereof. A branching agent can be a substituted or unsubstituted polyfunctional $C_{1-20}$ hydrocarbon group having at least three of any one or more of the aforementioned functional groups. Exemplary branching agents can include a $C_{2-20}$ alkyltriamine, a $C_{2-20}$ alkyltetramine, a $C_{6-20}$ aryltriamine, an oxyalkyltriamine (e.g., JEFFAMINE T-403™ available from Texaco Company), trimellitic acid, trimellitic anhydride, trimellitic trichloride, and the like, and combinations comprising at least one of the foregoing. When present, the amount of branching agent can be 0.01 to 10 weight percent based on the weight of the polyimide prepolymer.

The polyimide-forming compositions can further comprise a particulate polymer dispersible in the solvent, for example dispersible in the $C_{1-6}$ alcohol, in a solution of the $C_{1-6}$ alcohol and water, or in water. In an embodiment, the particulate polymers are preferably dispersible in water. Imidization of the polyimide prepolymer in the presence of the particulate polymer can provide an intimate blend of the polymer and the polyimide. The dispersible polymers can have an average particle diameter from 0.01 to 250 micrometers. Aqueous-dispersible polymers include fluoropolymers, (e.g., polytetrafluoroethylene, tetrafluoroethylene-perfluoroalkylvinylether copolymer, tetrafluoroethylene-hexafluoropropylene copolymer, polychlorotrifluoroethylene, tetrafluoroethylene-ethylene copolymer, polyvinylidene fluoride), (meth)acrylic and (meth)acrylate polymers (e.g., poly(methyl (meth)acrylate), poly(ethyl (meth)acrylate), poly(n-butyl (meth)acrylate), poly(2-ethyl hexyl (meth)acrylate), copolymers thereof, and the like), styrenic polymers (e.g., polystyrene, and copolymers of styrene-butadiene, styrene-isoprene, styrene-acrylate esters, and styrene-acrylonitrile), vinyl ester polymers (e.g., poly(vinyl acetate), poly(vinyl acetate-ethylene) copolymers, poly(vinyl proprionate), poly(vinyl versatate) and the like), vinyl chloride polymers, polyolefins (e.g., polyethylenes, polyproplyenes, polybutadienes, copolymers thereof, and the like), polyurethanes, polyesters (e.g., poly(ethylene terephthalate), poly(butylene terephthalate), poly (caprolactone), copolymers thereof, and the like), polyamides, natural polymers such as polysaccharides, or a combination comprising at least one of the foregoing.

When present, the dispersible polymers can be present in an amount of 0.01 to 50 wt %, preferably 1 to 30 wt %, more preferably from 5 to 20 wt %, each based on the total weight of the monomers in the composition.

The polyimide-forming compositions can further comprise additives for polyimide compositions known in the art, with the proviso that the additive(s) are selected so as to not significantly adversely affect the desired properties of the compositions, in particular formation of the polyimide. Such additives include a particulate filler (such as glass, carbon, mineral, or metal), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. In general, the additives are used in the amounts generally known to be effective. For example, the total amount of the additive composition (other than any filler) can be 0.001 to 10.0 wt %, or 0.01 to 5 wt %, each based on the total weight of the monomers in the composition.

For example, a combination of a heat stabilizer, mold release agent, and ultraviolet light stabilizer can be used. Pigments, surface effect agents, and nanosized fillers are also specifically contemplated, as such materials can be readily co-dispersed with monomers, or pre-combined with the monomers. When present, the nanosized fillers can be present in an amount of 0.001 to 50 wt %, preferably 1 to 30 wt %, more preferably from 2 to 10 wt %, each based on the total weight of the monomers in the composition.

The polyimide-forming compositions can be manufactured according to a method comprising f heating a substituted or unsubstituted $C_{4-40}$ bisanhydride in a $C_{1-6}$ alcohol to dissolve the bisanhydride and adding a substituted or unsubstituted divalent $C_{1-20}$ diamine to form a polyimide prepolymer. Such procedures are described, for example, in U.S. Pat. Nos. 4,988,544 A and 4,960,824 A.

The polyimide prepolymer can comprise partially reacted units of formulas q and r to fully reacted units of formula s.

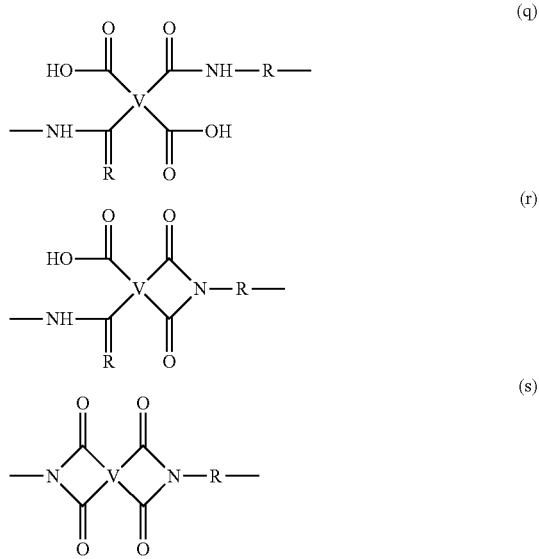

wherein V and R are as defined above. The polyimide prepolymer contains at least one unit (q), 0 or 1 or more units (r), and 0 or 1 or more units (s), for example 1 to 200 or 1 to 100 units q, 0 to 200 or 0 to 100 units (r), or 0 to 200 or 0 to 100 units (s). An imidization value for the polyimide prepolymer can be determined using the relationship $$(2s+r)/(2q+2r+2s)$$

wherein q, r, and s stand for the number of units (q), (r), and (s), respectively. In some embodiments, the imidization value of the polyimide prepolymer is less than or equal to 0.2, less than or equal to 0.15, or less than or equal to 0.1. In some embodiments, the polyimide prepolymer has an imidization value of greater than 0.2, for example greater than 0.25, greater than 0.3, or greater than 0.5, provided that the desired solubility of the polyimide prepolymer is maintained. The number of units of each type can be determined by spectroscopic methods, for example Fourier Transform Infrared (FT-IR) spectroscopy.

The amine is added in an amount effective to solubilize the polyimide prepolymer in the $C_{1-6}$ alcohol, in a solution of the $C_{1-6}$ alcohol and water, or in water. In an embodiment, the heating is at a temperature less than or equal to the boiling point of the $C_{1-6}$ alcohol at atmospheric pressure, or at a temperature greater than 100° C. at a pressure greater than atmospheric pressure.

The polyimide-forming compositions can be used in the manufacture of articles useful for a wide variety of applications. An article comprising a polyimide can be manufactured from the polyimide-forming compositions by, for example, forming a preform comprising the article from the polyimide-forming compositions, for example by spinning, spraying, casting, coating a substrate, impregnating a porous substrate, coating a surface of a mold, or disposing the polyimide-forming composition in a mold. The preform can accordingly have the form of a fiber, a coating, or a layer. The coatings and layers can have a wide range of thicknesses, for example from 0.1 to 1500 micrometers, or from 1 to 250 micrometers. The thickness can be adjusted by adjusting the amount of solids in the compositions, or by using a doctor blade or similar device.

The preform is then heated at a temperature and for a period of time effective to imidize the polyimide prepolymer and form the polyimide. Suitable temperatures are greater than or equal to 225° C., preferably 250 to 500° C., more preferably 300 to 450° C., for a time from 10 minutes to 3 hours, preferably 15 minutes to 1 hour. The imidization can be conducted under an inert gas during the heating. Examples of such gases are dry nitrogen, helium, argon and the like. Dry nitrogen is generally preferred. In an advantageous feature, such blanketing is not required. The imidization is generally conducted at atmospheric pressure.

The solvent can be removed from the preform during the imidization, or the solvent can be removed from the preform before the imidization, for example by heating to a temperature below the imidization temperature. The solvent can be partially removed, or can be fully removed.

If a crosslinker is present in the polyimide-forming composition, crosslinking can occur before the imidization, during the imidization, or after the imidization. For example, when the crosslinker comprises ethylenically unsaturated groups, the preform can be crosslinked by exposure to ultraviolet (UV) light, electron beam radiation or the like, to stabilize the preform. Alternatively, the polyimide can be post-crosslinked to provide additional strength or other properties to the polyimide.

The articles comprising the polyimide can be a fiber, a layer, a conformal coating, a molded article, a membrane, a prepreg, a composite article, or a composite molded article. For example the polyimides can be used to form thick or thin layers, as fiber sizing, as wire and cable coatings, as cookware and industrial coatings, as powder coatings, and in compression molded parts. One or more additional fabrication operations can be performed on the articles, such as molding, in-mold decoration, baking in a paint oven, vapor metallization, sputtering, hardcoating, lamination, or thermoforming. Those skilled in the art will also appreciate that common curing and surface modification processes such as heat-setting, texturing, embossing, corona treatment, flame treatment, plasma treatment and vacuum deposition can further be applied to the articles to alter surface appearances and impart additional functionalities to the articles.

In some embodiments, the polyimide is a layer, which can be formed by casting or coating the polyimide-forming composition onto a substrate or release layer to form a cast or coated preform layer. Exemplary substrates include natural and synthetic materials, and can be papers, cast films, decorative films, foams, including those of polyurethane, interleaving cards, woven cloths, reverse faces of self-adhesive tapes, self-adhesive films, text-bearing faces of self-adhesive labels, packaging material, cardboard boxes, metal foils, drums, cardboards, plastic films such as glassine paper, Kraft paper, chemical papers, calendared or glazed papers, parchmentized papers or precoated papers, and woven and non-woven fabrics. To provide a thin and uniform layer a dispenser or bath can be used for example a slit nozzle, needle nozzle, valve, spray nozzle, pouring nozzle, air brush, knife, bar (bar coater), blades, doctor blades, metering pumps, cartridges or powered syringes, size presses, film presses or other tools by dipping, brushing, flow coating, trailing blade, inverted blade, SDTA (Short Dwell Time Applicator), roller blade, reverse roll coating, kiss coating, spraying, rolling or printing, by means of an offset gravure-coating apparatus, by (air)-knife or doctor-blade coating or using an airbrush.

The solvent can be removed by evaporation assisted by additional air streams including heated air, heated inert gases such as nitrogen, or steam-heated rolls, to better control the temperature of the carrier layer. Imidization can be initiated by heating, for example in an oven, or by heating the preform layer under heat and pressure, for example by laminating the preform layer to another substrate. Very thin layers can be formed, for example layers having a thickness of 0.1 to 1500 micrometers, specifically 1 to 750 micrometers, more specifically 10 to 150 micrometers, and even more specifically 10 to 100 micrometers. Multilayer articles can also be made, by forming the preform layer on a multilayer substrate, or by subsequent metallization, or adhesion or lamination to one or more additional layers. Single or multiple layers of coatings can further be applied to the single or multi-layer polyimide layer to impart additional properties such as scratch resistance, ultraviolet light resistance, aesthetic appeal, lubricity, and biocompatibility. Coatings can be applied through standard application techniques such as rolling, spraying, dipping, brushing, or flow-coating. In an embodiment, the layer can be used as a packaging material, capacitor film, or circuit board layer.

In other embodiments, the polyimide is a conformal coating on a three-dimensional object. The preform coating can be applied by spraying, dipping, powder-spraying, or otherwise disposing the polyimide-forming composition onto a substrate, followed by solvent removal and imidization. Very thin coatings can be formed, for example coatings having a thickness of 0.1 to 1500 micrometers, specifically 5 to 750 micrometers, more specifically 10 to 150 micrometers, and even more specifically 10 to 100 micrometers. In an embodiment, the article is a wire or cable comprising the polyimide coating.

A method of manufacturing a composite article can comprise impregnating a porous base material with the polyimide-forming composition, and subsequently imidizing the composition to form a polyimide coating or filling the porous base material. As used herein, a "porous base material" can be any base material having any size pores or openings that may or may not be interconnected. Thus, a porous base material may be a fibrous preform or substrate, a porous material comprising a ceramic, a polymer, a glass, carbon, or a combination comprising at least one of the foregoing. For example, the porous base material can be woven or non-woven glass fabric, a fiber glass fabric, or carbon fiber. Removing the solvent from the impregnated porous base material can be achieved by heating, compressing, or heating and compressing the material. The impregnated porous base material can optionally be shaped before or after the imidization, and before or after the solvent removal step. The impregnated porous base material can also be shaped after curing, by thermoforming, for example. The composite article prepared by the above-described method can be in the form of a fiber, a layer, a cast article, a prepreg, a wire coating, a molded article, a compression article, or a reinforced composite article.

In another specific embodiment, the polyimide-forming composition can be used to coat a mold or in compression molding to provide a molded article. Before imidization, an additional material can be inserted into the mold to form a composite molded article.

Depending on the monomers and other materials used in the polyimide-forming compositions, the polyimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyimide has a weight average molecular weight (Mw) of greater than 1,000 grams/mole (Daltons), or greater than 5,000 Daltons, or greater than 10,000 Daltons, or greater than 50,000 Daltons, or greater than 100,000 Daltons as measured by gel permeation chromatography, using polystyrene standards. For example, the polyimide can have a weight average molecular weight (Mw) of 1,000 to 150,000 Daltons. In some embodiments the polyimide has a Mw of 10,000 to 80,000 Daltons, specifically greater than 10,000 Daltons or greater than 60,000 Daltons, up to 100,000 or 150,000 Daltons. In some embodiments, the polyimide has a molecular weight that is no more than 10% lower than the molecular weight of the same polyimide formed in the absence of the amine. The polyimides can further have a polydispersity index of 2.0 to 3.0, or 2.3 to 3.0.

The polyimides are further characterized by the presence of less than 1 wt %, or less than 0.1 wt % of a nonprotic organic solvent. In an embodiment, it is preferred that the polyimide is devoid of a nonprotic organic solvent. Similarly, the polyimide has less than 1 wt %, or less than 0.1 wt % of a halogenated solvent, and preferably the polyimide is devoid of a halogenated solvent. Such properties are particularly useful in layers or conformal coatings having a thickness from 0.1 to 1500 micrometers, specifically 1 to 500 micrometers, more specifically 5 to 100 micrometers, and even more specifically 10 to 50 micrometers.

The methods of manufacturing polyimides and articles comprising the polyimides described herein do not rely on organic solvents, and allows for very thin layers of polyimide to be obtained. The method is useful not only for layers and coatings, but also for forming composites. Therefore, a substantial improvement in methods of manufacturing polyimides and articles prepared therefrom is provided.

The compositions and methods are further illustrated by the following non-limiting examples.

EXAMPLES

Materials used in the following examples are provided in Table 1.

B. Molecular Weight and Stoichiometric Analysis of the Polyimide Prepolymer

The stoichiometric analysis of excess amine or excess anhydride was measured via FT-IR. Two grams of the reactor contents was transferred to a PTFE-coated aluminum tube. The tube was heated to 385° C. under nitrogen for 15 minutes to form the corresponding polyimide. Additional diamine or bisanhydride was added to the reactor when the mole percent (mol %) of anhydride or amine end groups were greater than 0.2 mol %. The stoichiometry was analyzed repeatedly using this method until the amine or anhydride end groups were less than 0.2 mol %.

TABLE 1

| Materials | Description | Supplier |
|---|---|---|
| BPA-DA | Bisphenol A dianhydride; CAS Reg. No. 38103-06-9; 520.5 grams/mole | SABIC |
| MPD | m-Phenylenediamine; CAS Reg. No. 108-45-2; 108.1 grams/mole | Dupont |
| PA | Phthalic Anhydride; CAS Reg. No. 85-44-9; 148.1 grams/mole | Koppers |
| PPD | p-Phenylenediamine; CAS Reg. No. 106-50-3; 108.1 grams/mole | Dupont |
| DDS | 4,4'-Diaminodiphenylsulfone; CAS Reg. No. 80-08-0; 248.3 grams/mole | Sigma-Aldrich |
| TEA | Triethylamine; CAS Reg. No. 121-44-8; 101.19 grams/mole | Acros Organics |
| DMEA | Dimethylethanolamine; CAS Reg. No. 108-01-0; 89.14 grams/mole | Acros Organics |
| DEA | Diethanolamine; CAS Reg. No. 111-42-2; 105.14 grams/mole | Acros Organics |

A. Polyimide Prepolymer Formation

Polyimide prepolymers were prepared in methanol or ethanol. The monomers shown in Table 1 were ground using a lab scale mechanical grinder and sieved through a 45 micron classifier.

BPA-DA, PA, and methanol or ethanol were combined and mixed well. The mixture was refluxed under a nitrogen atmosphere using a bath heated to 100° C. until the anhydrides were completely dissolved. An equimolar amount of diamine was added to the mixture, and the solution was refluxed for an additional three hours. Progress of the polymerization was monitored by adding two drops of reaction mixture to 10 milliliters (ml) of methylene chloride every 20 minutes. After about two hours, adding two drops of the reaction mixture to 10 milliliters of methylene chloride produced precipitate, indicating high molecular weight polymer formation.

Three grams of the final stoichiometrically-corrected polyimide prepolymer was transferred to a PTFE-coated aluminum tube. The tube was heated to 385° C. under nitrogen for 15 minutes to form the corresponding polyimide. 0.015 grams of polyimide was dissolved in 10 milliliters (ml) of methylene chloride. 10 microliters (µl) of this polymer solution was analyzed in GPC (gel permeation chromatography). The molecular weight of the polymer was reported using polystyrene as standard. Thermal properties such as glass transition temperature (Tg) and thermogravimetric analysis (TGA) of the corresponding polyimides were also evaluated. Prepolymer compositions and corresponding polyimide properties are shown in Table 2. Amount of each component is provided in grams.

TABLE 2

| Component | Units | 1 | 2 | 3 | 4 | 5 | 6 |
|---|---|---|---|---|---|---|---|
| BPA-DA | g | 40 | 40 | 40 | 40 | 40 | 40 |
| PA | g | 0.25 | 0.25 | 0.25 | 0.25 | 0.25 | 0.25 |
| MPD | g | 8.307 | 8.307 | | | | |
| PPD | g | | | 8.307 | 8.307 | | |
| DDS | g | | | | | 19.08 | 19.08 |
| Methanol | g | 50 | | 50 | | 50 | |
| Ethanol | g | | 50 | | 50 | | 50 |
| Properties |||||||| 
| Homogeneity[1] | | H | H | H | N | N | N |
| Water solubility | | Not soluble | Not soluble | Not soluble | Not soluble | Not soluble | Not soluble |
| Molecular weight | g/mol | 61,267 | 61,577 | 65,271 | 66,331 | 60,907 | 74,160 |
| Polydispersity | | 2.3 | 2.9 | 2.3 | 2.2 | 2.3 | 2.9 |
| Tg | ° C. | 216 | 218 | 231 | 231 | 247 | 249 |
| TGA, onset temperature [2] | ° C. | 539 | 529 | 541 | 537 | 532 | 536 |

[1]Homogeneity determined after 24 hours of storage under nitrogen at 4° C. (H = homogeneous polyimide precursor solution; N = non-homogeneous polyimide precursor solution). Solutions marked as "non-homogeneous" could be heated to at least 50° C. to restore homogeneity.
[2] TGA was evaluated under nitrogen atmosphere.

As illustrated by Examples 1-6 in Table 2, polyimides formed from the polyimide prepolymers had relatively high molecular weight (greater than 60,000 grams/mole) and polydispersities below 3.0. Furthermore, the thermal properties of the polyimides were noted to be similar to the thermal properties of corresponding polyimides made from organic solvents, such as ortho-dichlorobenzene.

B. Water Soluble Polyimide Prepolymers

The polyimide prepolymers of examples 1-6 were not soluble in deionized water. The inventors hereof surprisingly discovered that adding a secondary amine (diethanolamine) or a tertiary amine (dimethylethanolamine or triethylamine) to the alcohol solutions of polyimide prepolymers yielded water-soluble polyimide prepolymers.

The minimum amount of amine effective to form a water soluble polyimide prepolymer was determined according to the following method. To 20 grams of a polyimide prepolymer solution in alcohol (methanol or ethanol), an amine was added incrementally. After each addition, the solution was mixed thoroughly. A micro-droplet of the amine-containing solution was added to an excess amount of deionized water. The solubility was analyzed by visual inspection, and addition of amine was continued until complete aqueous solubility was achieved. The amount of amine required to achieve complete dissolution of the polyimide prepolymer solution in water was noted. The minimum amount of amine needed for complete water solubility was calculated as weight percent (wt %) based on the dry weight of the polyimide prepolymer.

The dry weight of the polyimide prepolymer was obtained by heating 2 grams of prepolymer solution at 385° C. for 15 minutes under nitrogen. The weight of the dried polyimide prepolymer was measured, and the corresponding dry weight of the polymer in 20 grams of polyimide prepolymer solution was calculated. Comparing the weight of amine needed for water solubility to the total weight of the dry prepolymer and the amine gave the weight percent of amine needed to make the polyimide prepolymer completely soluble in water. The results are presented in Table 3.

TABLE 3

| | Minimum amount amine needed for complete water solubility (wt %, based on combined weight of added amine and dry weight of prepolymer) | | |
|---|---|---|---|
| Ex. No. | TEA | DMEA | DEA |
| 1 | 11.1 | 14.6 | 14.37 |
| 2 | 9.9 | 13.0 | — |
| 3 | 12.6 | 6.8 | 9.3 |
| 4 | 12.3 | 10.1 | — |
| 5 | 16.1 | 22.8 | — |
| 6 | 21.3 | 32.3 | — |

Table 3 shows that the tertiary amines triethylamine and dimethylethanolamine (TEA and DMEA, respectively) can be used to impart water solubility to the polyimide prepolymer when used in an amount of 5 to 50 wt % based on the dry weight of the polyimide prepolymer. The minimum amount of tertiary amine effective to form the water soluble polyimide prepolymer varied across examples 1-6. Table 3 further shows that diethanolamine (DEA), a secondary amine containing hydroxy groups, can also be used to impart water solubility to the polyimide prepolymer when used in an amount of 9 to 15 wt % based on the dry weight of the polyimide prepolymer.

The polyimide prepolymer of Example 7 was prepared from BPA-DP (40 grams) and MPD (8.307 grams) using 0.25 grams of PA as a chain stopper in methanol (50 grams), and was prepared according to the above described procedure. Each of Examples 7 to 13 had the same composition as Example 7, but no amine or the minimum amount of each amine was added to a methanol or methanol/water solution of the polyimide prepolymer, with or without water. The amounts of TEA, DMEA and DEA were 11.1, 14.6 and 14.37 wt % respectively, based on the dry weight of the prepolymer and the added amine. The polyimide prepolymers of examples 7-13 were imidized by heating to 385° C. under nitrogen for 15 minutes, and the corresponding polyimides were characterized in terms of molecular weight and polydispersity by GPC. These results are shown in Table 4.

TABLE 4

| Component | Units | 7 | 8 | 9 | 10 | 11 | 12 | 13 |
|---|---|---|---|---|---|---|---|---|
| BPA-DA | g | 40 | 40 | 40 | 40 | 40 | 40 | 40 |
| PA | g | 0.25 | 0.25 | 0.25 | 0.25 | 0.25 | 0.25 | 0.25 |
| MPD | g | 8.307 | 8.307 | 8.307 | 8.307 | 8.307 | 8.307 | 8.307 |
| MeOH | g | 50 | 50 | 50 | 50 | 50 | 50 | 50 |
| Amine | | — | TEA | TEA | DMEA | DMEA | DEA | DEA |
| Wt % Amine added | % | — | 11.1 | 11.1 | 14.6 | 14.6 | 14.37 | 14.37 |
| Water Added?[a] | | — | — | yes | — | yes | — | yes |
| Molecular weight | g/mol | 61,267 | 70,332 | 78,479 | 67,194 | 58,559 | 57,923 | 37,568 |
| Polydispersity | | 2.3 | 2.84 | 2.86 | 2.6 | 2.47 | 9.76 | 8.19 |

[a]Added in a 1:1 weight ratio of methanol:water

Examples 8, 10, and 12 illustrate the effect of adding only TEA, DMEA, or DEA, respectively, on the molecular weight and polydispersity of the polyimide formed from the corresponding polyimide prepolymer solution. Examples 9, 11, and 13 show how the molecular weight and polydispersity can be further altered by the addition of water in a 1:1 weight ratio of alcohol:water.

The results in Table 4 show that adding a tertiary amine such as TEA or DMEA (examples 8 and 10, respectively) increased the molecular weight of the polyimide from about 61,000 g/mole to about 67,000-71,000 g/mole, with only modestly increased polydispersity. Addition of water to the sample having TEA further increased the molecular weight to about 78,000 g/mole (example 9), while DMEA in the presence of water showed a decrease in molecular weight (example 11). Addition of water together with DEA resulted in still further decreased molecular weight (example 13).

Samples including TEA showed the greatest increases in molecular weight. Addition of a secondary amine, DEA, resulted in high polydispersities of about 8-9 for polyimide prepolymer solutions with and without the addition of water (examples 12 and 13).

C. Making a Coating or Film.

The polyimide prepolymer solutions of example 7-13 were spread in a glass plate to make a preform coating using a metal wire rod. The thickness of the wet coating can be controlled by using an appropriate wire rod. The thickness of the dry coating or film can be controlled by the solids percent in the polyimide prepolymer solution. For these examples, a 30 micrometer wire rod was used. After the preform coating was made, the glass plates were placed in an oven programmed to go from room temperature to 80° C. at the rate of 30° C./min and held at 80° C. for 15 minutes. In a second step, the temperature was further increased from 80° C. to 350° C. at the rate of 30° C./min and held at 350° C. for 15 minutes. After this, the oven was cooled to room temperature at the rate of 30° C./min. During this heating and cooling process, the oven was blanketed with a nitrogen atmosphere. The glass plates were taken out and immersed in de-ionized water for one or two days for removing the protective coating/films.

Each prepolymer solution containing a tertiary amine (either TEA or DMEA) resulted in flexible, transparent, tough films, both with and without water added at a 1:1 weight ratio of alcohol:water. Properties of the films/coatings prepared from the polyimide prepolymer solutions of examples 7-13 are provided in Table 5.

TABLE 5

| Polyimide prepolymer solution | Description | Film Properties |
| --- | --- | --- |
| 7 | Polyimide prepolymer in MeOH | Flexible, transparent, tough film |
| 8 | Example 7 + TEA | Flexible, transparent, tough film |
| 9 | Example 7 + TEA + water | Flexible, transparent, tough film |
| 10 | Example 7 + DMEA | Flexible, transparent, tough film |
| 11 | Example 7 + DMEA + water | Flexible, transparent, tough film |
| 12 | Example 7 + DEA | Brittle film |
| 13 | Example 7 + DEA + water | Brittle film |

The results in Table 4 show that samples containing the tertiary amines (TEA and DMEA, examples 8-11) formed flexible, transparent, tough films both with and without added water show that samples containing the secondary amine (DEA, examples 12-13) formed brittle films both with and without added water. Free-standing films were not readily prepared from the polyimide prepolymer solutions containing the secondary amine diethanolamine.

The polyimide-forming compositions, methods of manufacture, and articles prepared therefrom are further illustrated by the following Embodiments, which are non-limiting.

Embodiment 1

A polyimide-forming composition, comprising a polyimide prepolymer; an amine, a solvent comprising, consisting essentially of, or consisting of a $C_{1-6}$ alcohol.

Embodiment 2

The polyimide-forming composition of embodiment 1, wherein the polyimide prepolymer comprises a substituted or unsubstituted $C_{4-40}$ bisanhydride and a substituted or unsubstituted divalent $C_{1-20}$ diamine.

Embodiment 3

The polyimide-forming composition of embodiment 1 or embodiment 2, wherein a mole ratio of the bisanhydride to the diamine is 1:1 to 1:1.3.

Embodiment 4

The polyimide-forming composition of embodiment 1 or embodiment 2, wherein a mole ratio of the diamine to the bisanhydride is 1:1 to 1:1.3.

Embodiment 5

The polyimide-forming composition of any one or more of embodiments 2 to 4 wherein the bisanhydride is of the formula

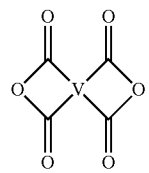

wherein V is a substituted or unsubstituted $C_{6-20}$ aromatic hydrocarbon group, a substituted or unsubstituted, straight or branched chain, saturated or unsaturated $C_{2-20}$ aliphatic group, or a substituted or unsubstituted $C_{4-8}$ cycloalkylene group or halogenated derivative thereof, and the diamine is of the formula

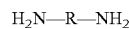

$H_2N-R-NH_2$ wherein R is a substituted or unsubstituted $C_{6-20}$ aromatic hydrocarbon group or a halogenated derivative thereof, a substituted or unsubstituted, straight or branched chain, saturated or unsaturated $C_{2-20}$ alkylene group or a halogenated derivative thereof, a substituted or unsubstituted $C_{3-8}$ cycloalkylene group or halogenated derivative thereof.

Embodiment 6

The polyimide-forming composition of any one or more of embodiments 2 to 5, wherein the bisanhydride is of the formula

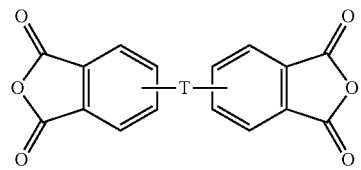

wherein T is —O— or a group of the formula —O—Z—O— wherein the divalent bonds of the —O— or the —O—Z—O— group are in the 3,3', 3,4', 4,3', or the 4,4' positions, and Z is an aromatic $C_{6-24}$ monocyclic or polycyclic group optionally substituted with 1 to 6 $C_{1-8}$ alkyl groups, 1-8 halogen atoms, or a combination comprising at least one of the foregoing; and the diamine is of the formula

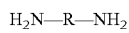

wherein R is a divalent group of any of the formulas

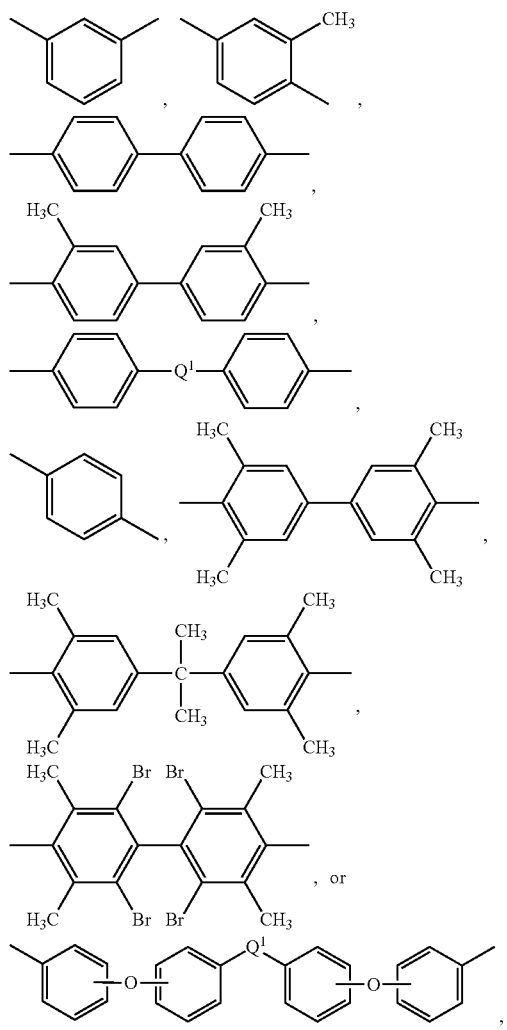

wherein $Q^1$ is —O—, —S—, —C(O)—, —$SO_2$—, —SO—, —$C_yH_{2y}$— and a halogenated derivative thereof wherein y is an integer from 1 to 5, or —$(C_6H_{10})_z$— wherein z is an integer from 1 to 4.

Embodiment 7

The polyimide-forming composition embodiment 6, wherein Z is a group derived from a dihydroxy compound of the formula

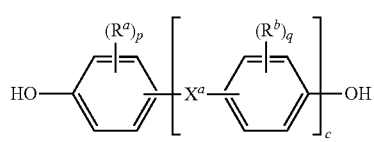

wherein $R^a$ and $R^b$ are each independently a halogen atom or a monovalent $C_{1-6}$ alkyl group; p and q are each independently integers of 0 to 4; c is 0 to 4; and $X^a$ is a single bond, —O—, —S—, —S(O)—, —$SO_2$—, —C(O)—, or a $C_{1-18}$ organic bridging group.

Embodiment 8

The polyimide-forming composition of embodiment 6 or embodiment 7, wherein each R is independently meta-phenylene, para-phenylene, 4,4'-diphenylsulfone, or a combination comprising at least one of the foregoing, and the Z is 4,4'-diphenylene isopropylidene.

Embodiment 9

The polyimide-forming composition of any one or more of embodiments 6 to 8, wherein at least 10 mole percent of the R groups comprise a sulfone group, preferably wherein R is 4,4'-diphenylenesulfone and Z is 4,4'-diphenylene isopropylidene.

Embodiment 10

The polyimide-forming composition of any one or more of embodiments 1 to 9, wherein the amine comprises a secondary amine, a tertiary amine, or a combination comprising at least one of the foregoing, preferably a tertiary amine.

Embodiment 11

The polyimide-forming composition of embodiment 10, wherein the amine is a secondary or tertiary amine of the formula $$R^aR^bR^cN$$

wherein each $R^a$, $R^b$, and $R^c$ are the same or different and are a substituted or unsubstituted $C_{1-18}$ hydrocarbyl or hydrogen, provided that no more than one of $R^a$, $R^b$, and $R^c$ are hydrogen, preferably each $R^a$, $R^b$, and $R^c$ are the same or different and are a substituted or unsubstituted $C_{1-12}$ alkyl, a substituted or unsubstituted $C_{1-12}$ aryl, or hydrogen, provided that no more than one of $R^a$, $R^b$, and $R^c$ are hydrogen, more preferably each $R^a$, $R^b$, and $R^c$ are the same or different and are an unsubstituted $C_{1-6}$ alkyl or a $C_{1-6}$ alkyl substituted with 1, 2, or 3 hydroxyl, halogen, nitrile, nitro, cyano, $C_{1-6}$ alkoxy, or amino groups of the formula —$NR^dR^e$ wherein each $R^d$ and $R^e$ are the same or different and are a $C_{1-6}$ alkyl or $C_{1-6}$ alkoxy; and most preferably, each $R^a$, $R^b$, and $R^c$ are the same or different and are an unsubstituted $C_{1-4}$ alkyl or a $C_{1-4}$ alkyl substituted with one hydroxyl, halogen, nitrile, nitro, cyano, or $C_{1-3}$ alkoxy.

Embodiment 12

The polyimide-forming composition of embodiment 11, wherein the amine comprises triethylamine, trimethylamine, dimethylethanolamine, diethanolamine, or a combination comprising at least one of the foregoing.

Embodiment 13

The polyimide-forming composition of any one or more of embodiments 1 to 12, wherein the solvent comprises methanol, ethanol, n-propanol, isopropanol, or a combination comprising at least one of the foregoing.

Embodiment 14

The polyimide-forming composition of embodiment 13, wherein the solvent further comprises less than 1 wt % water, or is devoid of water.

Embodiment 15

The polyimide-forming composition of embodiment 13, wherein the solvent further comprises water in a weight ratio of $C_{1-6}$ alcohol:water of 1:100 to 100:1, preferably 1:10 to 10:1, more preferably 1:2 to 2:1, even more preferably 1:1.1 to 1.1:1.

Embodiment 16

The polyimide-forming composition of any one or more of embodiments 1 to 15, wherein the solvent comprises less than 1 wt % of a chlorobenzene, a dichlorobenzene, cresol, dimethyl acetamide, veratrole, pyridine, nitrobenzene, methyl benzoate, benzonitrile, acetophenone, n-butyl acetate, 2-ethoxyethanol, 2-n-butoxyethanol, dimethyl sulfoxide, anisole, tetrahydrofuran, cyclopentanone, gamma-butyrolactone, N,N-dimethyl formamide, N-methyl pyrrolidone, or a combination comprising at least one of the foregoing.

Embodiment 17

The polyimide-forming composition of any one or more of embodiments 1 to 16, comprising, based on the total weight of the composition, 1 to 90 wt %, preferably 5 to 80 wt %, more preferably 10 to 70 wt % of the polyimide prepolymer; 10 to 99 wt %, preferably 20 to 95 wt %, more preferably 30 to 90 wt % of the solvent, and 0.001 to 50 wt %, preferably 0.01 to 30 wt %, more preferably 0.01 to 15 wt % of the amine.

Embodiment 18

The polyimide-forming composition of any one or more of embodiments 1 to 17, wherein <0.5 grams of the amine is effective to solubilize 1 gram of the polyimide prepolymer in deionized water.

Embodiment 19

The polyimide-forming composition of any one or more of embodiments 1 to 18, comprising 5 to 50 wt % of the amine, or 8 to 40 wt % of the amine, or 9 to 35 wt % of the amine, based on the combined weight of the amine and the dry weight of the prepolymer.

Embodiment 20

The polyimide-forming composition of any one or more of embodiments 1 to 19, wherein the polyimide prepolymer is partially endcapped.

Embodiment 21

The polyimide-forming composition of any one or more of embodiments 1 to 20, further comprising a polyimide crosslinking agent.

Embodiment 22

The polyimide-forming composition of any one or more of embodiments 1 to 21, further comprising a branching agent.

Embodiment 23

The polyimide-forming composition of any one or more of embodiments 1 to 23, further comprising a pigment, a nanosized filler, or a combination comprising at least one of the foregoing.

Embodiment 24

The polyimide-forming composition of any one or more of embodiments 1 to 23, wherein the polyimide is devoid of an end capping agent.

Embodiment 25

The polyimide-forming composition of any one or more of embodiments 1 to 24, further comprising a particulate polymer having an average particle diameter from 0.1 to 250 micrometers.

Embodiment 26

A method of manufacturing the polyimide-forming composition of any one or more of embodiments 1 to 25, the method comprising heating a substituted or unsubstituted $C_{4-40}$ bisanhydride in a solvent comprising, consisting essentially, or preferably consisting of a $C_{1-6}$ alcohol to dissolve the bisanhydride; adding a substituted or unsubstituted divalent $C_{1-20}$ diamine under conditions effective to form a polyimide prepolymer; and adding the amine in an amount effective to solubilize the polyimide prepolymer in the $C_{1-6}$ alcohol, in a solution of the $C_{1-6}$ alcohol and deionized water, or in deionized water.

Embodiment 27

The method of embodiment 26, wherein the heating is at a temperature equal to the boiling point of the $C_{1-6}$ alcohol at atmospheric pressure, or at a temperature greater than 100° C. at a pressure greater than atmospheric pressure.

Embodiment 28

A method of manufacturing an article comprising a polyimide, the method comprising forming a preform comprising the polyimide-forming composition of any one or more of embodiments 1 to 25; and heating the preform at a temperature and for a period of time effective to imidize the polyimide prepolymer and form the polyimide.

Embodiment 29

The method of embodiment 28, wherein the forming is by spinning, spraying, casting, coating a surface of a substrate, impregnating a porous substrate, coating a surface of a mold, or disposing the polyimide-forming composition in a mold.

Embodiment 30

The method of embodiment 28 or embodiment 29, wherein the heating the preform is at a temperature greater than or equal to 250 C preferably 300 to 450° C.

Embodiment 31

The method of any one or more of embodiments 28 to 30, further comprising removing the solvent from the preform before the heating to imidize the polyimide prepolymer.

Embodiment 32

The method of any one or more of embodiments 28 to 30, further comprising removing the solvent during the heating to imidize the polyimide prepolymer.

Embodiment 33

The method of any one or more of embodiments 28 to 32, further comprising crosslinking the polyimide before or during the imidizing.

Embodiment 34

The method of any one or more of embodiments 28 to 32, further comprising crosslinking the polyimide after the imidizing.

Embodiment 35

The method of any one or more of embodiments 28 to 34, wherein the article comprising the polyimide is a fiber, a layer, a conformal coating, a composite article, a composite molded article, or a molded article.

Embodiment 36

The method of any one or more of embodiments 28 to 35, wherein the polyimide has a weight average molecular weight of greater than 5,000 Daltons, or greater than 10,000 Daltons, or greater than 50,000 Daltons, or greater than 100,000 Daltons.

Embodiment 37

The method of any one or more of embodiments 28 to 36, wherein the polyimide has a polydispersity index of 2.0 to 3.0, or 2.3 to 3.0.

Embodiment 38

The method of any one or more of embodiments 28 to 37, wherein the polyimide has a molecular weight no more than 10% lower than the same polyimide formed in the absence of the amine.

Embodiment 39

The method of any one or more of embodiments 28 to 38, wherein the polyimide comprises less than 1 wt %, or less than 0.1 wt % of a nonprotic organic solvent, preferably wherein the polyimide is devoid of a nonprotic organic solvent.

Embodiment 40

The method of any one or more of embodiments 28 to 39, wherein the polyimide has less than 1 wt %, or less than 0.1 wt % of a halogenated solvent, preferably wherein the polyimide is devoid of a halogenated solvent.

Embodiment 41

The method of any one or more of embodiments 28 to 40, wherein the article has a thickness 0.01 to 1500 micrometers, specifically 1 to 750 micrometers, more specifically 10 to 150 micrometers, and even more specifically 10 to 100 micrometers.

Embodiment 42

An article prepared by the method of any one or more of embodiments 28 to 41.

In general, the compositions and methods can alternatively comprise, consist of, or consist essentially of, any appropriate components herein disclosed. The compositions and methods can additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless clearly stated otherwise. It is to be understood that the described elements may be combined in any suitable manner in the various embodiments.

The term "hydrocarbyl" means a group containing carbon and hydrogen and optionally 1, 2, 3, or 4 heteroatoms selected from halogen, O, S, Si, P, and N. The term "alkyl" includes branched or straight chain, unsaturated aliphatic $C_{1-30}$ hydrocarbon groups e.g., methyl, ethyl, n-propyl, i-propyl, n-butyl, s-butyl, t-butyl, n-pentyl, s-pentyl, n- and s-hexyl, n- and s-heptyl, and, n- and s-octyl. "Alkenyl" means a straight or branched chain, monovalent hydrocarbon group having at least one carbon-carbon double bond (e.g., ethenyl ($-HC=CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($-CH_2-$) or propylene ($-(CH_2)_3-$)). "Cycloalkylene" means a divalent cyclic alkylene group, $-C_nH_{2n-x}$, wherein x is the number of hydrogens replaced by cyclization(s). The prefix "halo" means a group or compound including one more of a fluoro, chloro, bromo, or iodo substituent. A combination of different halo groups (e.g., bromo and fluoro) can be present. In an embodiment only chloro groups or only fluoro groups are present. The prefix "hetero" means that the compound or group includes at least one ring member that is a heteroatom (e.g., 1, 2, or 3 heteroatom(s)), wherein the heteroatom(s) is each independently N, O, S, or P. "Substituted" means that the compound or group is substituted with at least one (e.g., 1, 2, 3, or 4) substituents independently selected from an amino group of the formula $-NR^dR^e$ wherein each $R^d$ and $R^e$ are the same or different and are a $C_{1-6}$ alkyl, $C_{1-6}$ alkoxy $C_{1-9}$ alkoxy, a $C_{1-9}$ haloalkoxy, a nitro (—$NO_2$), a cyano (—CN), a hydroxy, a halogen, a $C_{1-6}$ alkyl sulfonyl (—S(═O)$_2$-alkyl), a $C_{6-12}$ aryl sulfonyl (—S(═O)$_2$-aryl)a thiol (—SH), a thiocyano (—SCN), a tosyl ($CH_3C_6H_4SO_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A polyimide-forming composition, comprising
10 to 70 wt. % of a polyimide prepolymer;
0.01 to 15 wt. % of an amine,
30 to 90 wt. % of a solvent comprising of a $C_{1-6}$ alcohol;
wherein weight percent is based on the total weight of the composition.

2. The polyimide-forming composition of claim 1, wherein the polyimide prepolymer comprises a substituted or unsubstituted $C_{4-40}$ bisanhydride and a substituted or unsubstituted divalent $C_{1-20}$ diamine.

3. The polyimide-forming composition of claim 1, wherein a mole ratio of the bisanhydride to the diamine is 1:1 to 1:1.3.

4. The polyimide-forming composition of claim 1, wherein a mole ratio of the diamine to the bisanhydride is 1:1 to 1:1.3.

5. The polyimide-forming composition of claim 1, wherein the amine comprises a secondary amine, a tertiary amine, or a combination comprising at least one of the foregoing.

6. The polyimide-forming composition of claim 1, wherein the solvent excludes a chlorobenzene, a dichlorobenzene, dichloromethane, cresol, dimethyl acetamide, veratrole, pyridine, nitrobenzene, methyl benzoate, benzonitrile, acetophenone, n-butyl acetate, 2-ethoxyethanol, 2-n-butoxyethanol, dimethyl sulfoxide, anisole, tetrahydrofuran, cyclopentanone, gamma-butyrolactone, N,N-dimethyl formamide, N-methyl pyrrolidone, or a combination comprising at least one of the foregoing.

7. The polyimide-forming composition of claim 6, wherein the solvent further comprises less than 1 wt. % water.

8. The polyimide-forming composition of claim 6, wherein the solvent further comprises water in a weight ratio of $C_{1-6}$ alcohol:water of 1:100 to 100:1.

9. The polyimide-forming composition of claim 1, wherein less than or equal to 0.5 grams of the amine is effective to solubilize 1 gram of the polyimide prepolymer in deionized water.

10. The polyimide-forming composition of claim 1, comprising 5 to 50 wt % of the amine, based on the combined weight of the amine and the dry weight of the prepolymer.

11. The polyimide-forming composition of claim 1, further comprising a polyimide crosslinking agent, a branching agent, a pigment, a nanosized filler, a particulate polymer having an average particle diameter from 0.1 to 250 micrometers, or a combination comprising at least one of the foregoing.

12. A method of manufacturing the polyimide-forming composition of claim 1, the method comprising
heating a substituted or unsubstituted $C_{4-40}$ bisanhydride in a solvent comprising a $C_{1-6}$ alcohol to dissolve the bisanhydride;
adding a substituted or unsubstituted divalent $C_{1-20}$ diamine under conditions effective to form a polyimide prepolymer; and
adding the amine in an amount effective to solubilize the polyimide prepolymer in the $C_{1-6}$ alcohol, in a solution of the $C_{1-6}$ alcohol and deionized water, or in deionized water
wherein the solvent excludes a chlorobenzene, a dichlorobenzene, dichloromethane, cresol, dimethyl acetamide, veratrole, pyridine, nitrobenzene, methyl benzoate, benzonitrile, acetophenone, n-butyl acetate, 2-ethoxyethanol, 2-n-butoxyethanol, dimethyl sulfoxide, anisole, tetrahydrofuran, cyclopentanone, gamma-butyrolactone, N,N-dimethyl formamide, N-methyl pyrrolidone, or a combination comprising at least one of the foregoing.

13. A method of manufacturing an article comprising a polyimide, the method comprising
forming a preform comprising the polyimide-forming composition of claim 1; and
heating the preform at a temperature and for a period of time effective to imidize the polyimide prepolymer and form the polyimide.

14. The method of claim 13, wherein the forming is by spinning, spraying, casting, coating a surface of a substrate, impregnating a porous substrate, coating a surface of a mold, or disposing the polyimide-forming composition in a mold.

15. The method of claim 13, further comprising removing the solvent from the preform before or during the heating to imidize the polyimide prepolymer.

16. The method of claim 13, further comprising crosslinking the polyimide before, during, or after the imidizing.

17. The method of claim 13, wherein the article comprising the polyimide is a fiber, a layer, a conformal coating, a composite article, a composite molded article, or a molded article; and the article has a thickness 0.01 to 1500 micrometers.

18. The method of claim 13,
wherein the polyimide is devoid of a nonprotic organic solvent; and
wherein the polyimide is devoid of a halogenated solvent.

19. An article prepared by the method of claim 13.

* * * * *